E. RUUD.
THERMOSTATIC VALVE MECHANISM.
APPLICATION FILED MAY 14, 1913.
1,090,654. Patented Mar. 17, 1914.
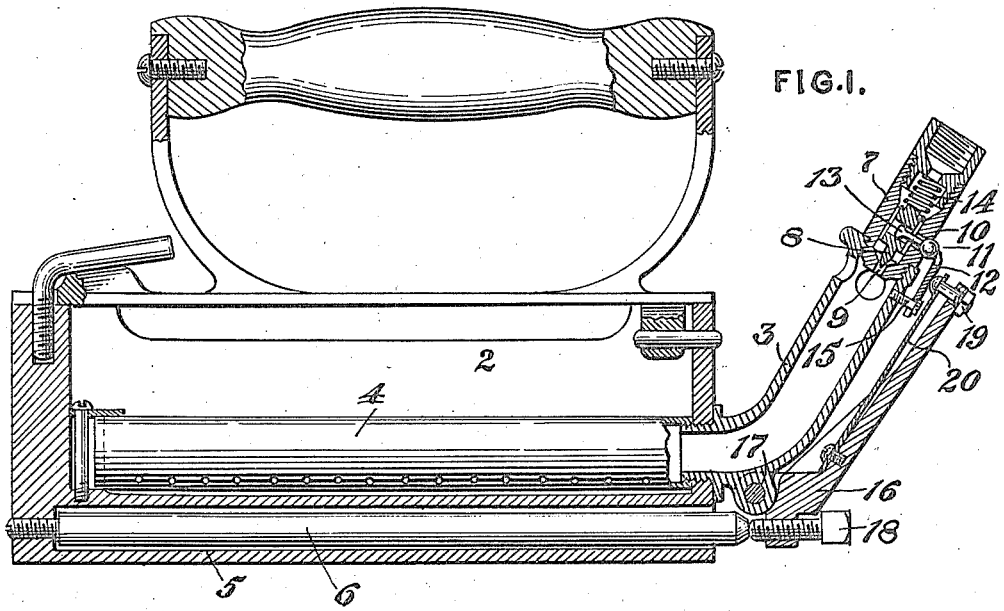
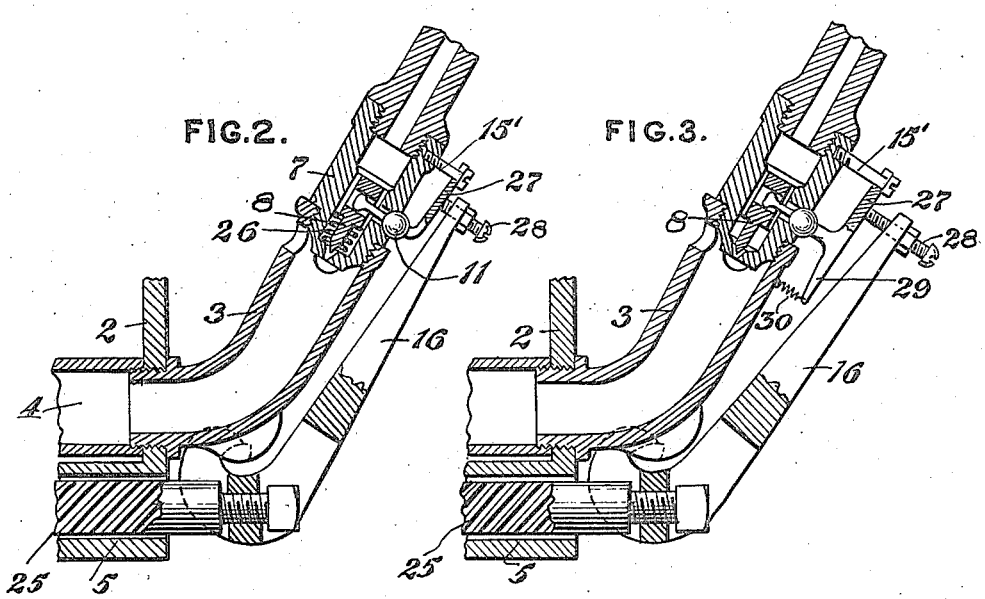

UNITED STATES PATENT OFFICE.

EDWIN RUUD, OF PITTSBURGH, PENNSYLVANIA.

THERMOSTATIC VALVE MECHANISM.

1,090,654.  Specification of Letters Patent.  Patented Mar. 17, 1914.

Application filed May 14, 1913. Serial No. 767,627.

*To all whom it may concern:*

Be it known that I, EDWIN RUUD, a citizen of the United States, and resident of Pittsburgh, in the county of Allegheny and State of Pennsylvania, have invented certain new and useful Improvements in Thermostatic Valve Mechanism, of which the following is a specification.

The primary object of this invention is to cause a gas controlling valve to be fully responsive to the sensitive adjustment of a thermostat even though the valve and its motion transmitting mechanism are so located as to be subject to wide temperature variations.

The invention has resulted from difficulty I have experienced in obtaining unrestricted movement of the thermostatically controlled valve of a self-heating flat iron. The valve and its operating mechanism are necessarily in close proximity to the iron and are immediately affected by the temperature thereof with the result that variations of several hundred degrees are experienced, and in order to obtain maximum efficiency from the thermostatic adjustment the valve and its actuating mechanism must move as freely when highly heated as when relatively cool, any sticking tendency resulting in immediately impairing the accuracy of the gas control. To meet these conditions I have provided the valve with an operating lever having a loose fulcrum which is held in gas-tight engagement with its bearing by the forces which operate the valve, and with the lever thus loose or movable it is unaffected by changes in temperature and no sticking tendency results such as is experienced when the motion transmitting device is clamped or positively held.

A further object of the invention is to provide a compensating connection between the thermostatic device and the valve whereby extreme movement of the former, as when under maximum contraction, will be compensated without exerting undue force on the valve mechanism.

In the accompanying drawings, Figure 1 is a vertical longitudinal section of the improved mechanism applied to a flat iron. Figs. 2 and 3 are similar views illustrating modifications.

Referring to the drawings, 2 designates the flat iron body, and 3 is the gas supply pipe carried thereby and communicating with burner 4. In the adaptation shown in Fig. 1, the lower portion of body 2 is formed with cavity 5 to receive the neutral thermostatic rod 6, the iron body being the contracting and expanding element for moving rod 6 to actuate the valve mechanism. Connected to tube 3 is the valve casing or fitting 7, and located therein is the sliding needle valve 8 for controlling the gas inlet orifice 9. A lateral opening in fitting 7 forms a circular socket-link bearing 10, and removably entered therein is the ball fulcrum 11 of lever 12, an arm 13 extending inwardly from the ball and engaging the valve for moving it longitudinally. Coiled spring 14 located in fitting 7 in line with the valve exerts constant pressure thereon for forcing it toward closed position, but the valve is prevented from fully seating by the adjustable stop 15 embraced by the extremity of lever 12.

Motion is transmitted from rod 6 to valve lever 12 by lever 16 which is fulcrumed at 17 to tube 3, a screw 18 adjustably connecting rod 6 and lever 16. Movable in the free upper end of lever 16 is bolt 19 which is held normally projected toward and in engagement with lever 12 by spring 20, the latter carried by arm 16 and embracing the bolt beneath its head, as shown.

In operation, when the iron body cools and contracts, rod 6 is forced outwardly and oscillates the free portion of lever 16 toward tube 3, and as spring 20 is stouter than spring 14, lever 12 is so oscillated as to move the valve away from orifice 9. The forces transmitted to lever 12 by spring 14 and by lever 16 are such that fulcrum ball 11 is held constantly pressed into tight engagement with bearing 10 and no gas can escape. With ball 11 loose in its bearing it is not adversely affected by expansion and contraction resulting from temperature variations, and as there is no sticking or binding tendency the mechanism is always free to respond to even the slightest movement emanating from the thermostatic control. When the iron becomes very cold and maximum contraction of body 2 results, lever 16 simply moves on bolt 19, the latter being held in engagement with lever 12 by spring 20. But as said spring is stronger than spring 14 bolt 19 provides a rigid connection with lever 12 under all normal operating conditions.

The invention may be variously applied. In Fig. 2 the thermostatic rod 25 is of copper or other material having a high coefficient of expansion and contraction so that the action of lever 16 is the reverse of the arrangement shown in Fig. 1, and this results in a reversal of the valve actuating spring and lever, the spring 26 being arranged beneath the valve and tending to force it open, with stop 15' limiting the opening movement, while lever 27 (corresponding to lever 12) is so disposed that the force applied by screw 28 of lever 16 operates to close the valve. But in this adaptation the resulting force of spring 26 and lever 16 is such as to hold ball 11 in gas-tight engagement with its bearing.

The adaptation of Fig. 3 is the same as that shown in Fig. 2, excepting that lever 27 is elongated to provide a tail piece 29 to which spring 30 is connected for opposing movement transmitted from lever 16, said spring being thus at the exterior of the valve and taking the place of the internal spring 26. In this embodiment both the spring and the thermostatic lever exert inward seating pressure on the ball valve.

While the invention is designed primarily for use on automatically controlled gas heated flat irons, it may be employed in any other service in which such mechanism may be useful.

I claim:—

1. The combination of a valve casing and valve for controlling a flow of gas, the casing provided with a bearing-forming lever opening, a valve actuating lever extending through the opening, a fulcrum for the lever movably fitting the bearing, and means for transmitting valve actuating force to the lever in direction to hold the fulcrum in gas-tight engagement with its bearing.

2. The combination of a valve casing and a valve for controlling a flow of gas, a valve actuating lever having its fulcrum loosely bearing in the casing with the fulcrum movable away from the latter, a spring for moving the valve in one direction, and a thermostatic device operatively connected to the lever for moving the valve in an opposite direction with the resultant force of the spring and thermostatic device pressing the lever fulcrum toward its bearing.

3. The combination of a valve casing and a valve for controlling a flow of gas, the exterior of the casing formed with a curved bearing and with a passage extending inwardly from the bearing, a lever having a curved fulcrum loosely fitting the bearing, an arm projecting inwardly from the ball fulcrum and operatively connected to the valve, a spring for moving the valve in one direction, and a thermostatic device operatively connected to the lever for moving the valve in opposition to the spring with the resultant force of the spring and thermostatic device pressing the ball fulcrum into gas-tight engagement with its bearing.

4. The combination of a valve casing and a valve slidable within the casing for controlling a flow of gas, the exterior of the casing formed with a bearing and with a slot extending inwardly from the bearing to the valve, a lever at the exterior of the casing, a fulcrum carried by the lever and loosely seated in said bearing, an arm projecting inwardly from the fulcrum and operatively engaging the valve for sliding the latter, a spring for moving the valve in one direction, and a thermostatic device operatively connected to the valve for moving it in an opposite direction with the resultant force of the spring and thermostatic device holding the fulcrum in gas-tight engagement with its bearing.

5. The combination of a valve and valve casing for controlling a flow of gas, a lever fulcrumed to the casing and operatively connected to the valve, a thermostatic device, a second lever operatively engaged by the thermostatic device, a bolt movable in the second lever, and a spring for holding the bolt normally extended from the second lever in position to engage the first mentioned lever.

6. The combination of a valve casing, a valve movable longitudinally therein for controlling a flow of gas therethrough, the casing formed with a lateral opening terminating in a socket-like bearing, a coiled spring within the casing and engaging the valve for moving it longitudinally in one direction, a lever having a ball fulcrum loosely entered in said bearing, an arm projecting inwardly from the ball fulcrum and engaging the valve, and a thermostatic device operatively connected to said lever with the resultant force of the spring and thermostatic device operating to hold the ball fulcrum in gas-tight engagement with its bearing.

7. The combination of a valve casing, a valve movable longitudinally therein for controlling a flow of gas therethrough, the casing having a lateral opening terminating at the exterior of the casing in a circular socket-like bearing, a lever having a ball fulcrum loosely seated in the bearing, an arm projecting inwardly from the said fulcrum and operatively engaging the valve, a thermostatic device, a second lever actuated by the thermostatic device, a bolt slidable in the second lever, and a spring for holding the bolt normally projected into engagement with the first mentioned lever.

8. The combination of a flat iron, a gas burner carried thereby, a burner controlling valve and valve casing carried by the iron and adapted to be heated thereby, the casing provided with a seat-forming lever opening, a valve actuating lever extending through the opening, a fulcrum for the lever fitting the seat and movable away from the latter along with the lever, and lever operating means exerting fulcrum-seating pressure on the lever.

9. The combination of a flat iron, a gas burner carried thereby, a burner controlling valve and valve casing carried by the iron and adapted to be heated thereby, the casing provided with a seat-forming lever opening, a valve actuating lever extending through the opening, a fulcrum for the lever fitting the seat and movable away from the latter along with the lever, a spring for moving the valve in one direction, and a thermostatic device controlled by the temperature of the iron and operatively engaging the lever for moving the valve in opposition to the spring.

In testimony whereof I affix my signature in presence of two witnesses.

EDWIN RUUD.

Witnesses:
S. A. McFarland,
J. M. Nesbit.